(12) United States Patent
Foster et al.

(10) Patent No.: US 10,925,257 B2
(45) Date of Patent: Feb. 23, 2021

(54) REMOTE CANINE TRAINING DEVICE

(71) Applicants: Jennifer B. Foster, Fishers, IN (US); Paul C. Mayes, Fishers, IN (US)

(72) Inventors: Jennifer B. Foster, Fishers, IN (US); Paul C. Mayes, Fishers, IN (US)

(*) Notice: Subject to any disclaimer, the term of this patent is extended or adjusted under 35 U.S.C. 154(b) by 471 days.

(21) Appl. No.: 15/649,670

(22) Filed: Jul. 14, 2017

(65) Prior Publication Data
US 2018/0014506 A1    Jan. 18, 2018

Related U.S. Application Data

(60) Provisional application No. 62/371,475, filed on Aug. 5, 2016, provisional application No. 62/362,088, filed on Jul. 14, 2016.

(51) Int. Cl.
*A01K 15/02* (2006.01)
*G08C 17/02* (2006.01)

(52) U.S. Cl.
CPC ............ *A01K 15/021* (2013.01); *G08C 17/02* (2013.01)

(58) Field of Classification Search
CPC .... A01K 15/021; A01K 15/02; A01K 15/022; A01K 15/023; A01K 27/009
See application file for complete search history.

(56) References Cited

U.S. PATENT DOCUMENTS

| | | | |
|---|---|---|---|
| 4,967,696 A | 11/1990 | Tobias | |
| 5,351,653 A | 10/1994 | Marischen et al. | |
| 5,605,116 A * | 2/1997 | Kim | A01K 15/021 119/720 |
| 5,749,324 A | 5/1998 | Moore | |
| 6,263,836 B1 | 7/2001 | Hollis | |
| 6,830,014 B1 | 12/2004 | Lalor | |
| 7,657,545 B2 | 2/2010 | Bird | |
| 8,438,999 B2 | 5/2013 | Hardi et al. | |
| 8,539,913 B2 | 9/2013 | Caputo et al. | |
| 8,543,134 B2 | 9/2013 | Lopez et al. | |
| 2003/0154930 A1 | 8/2003 | Maddox et al. | |
| 2004/0206310 A1* | 10/2004 | Hutchins | A01K 15/021 119/720 |
| 2005/0224003 A1 | 10/2005 | Yin et al. | |
| 2007/0056526 A1* | 3/2007 | Gianladis | A01K 15/021 119/721 |

(Continued)

*Primary Examiner* — Kristen C Hayes
(74) *Attorney, Agent, or Firm* — Matthew M. Googe; Robinson IP Law, PLLC

(57) ABSTRACT

A remote canine training devices includes: a speaker including a speaker controller and an antennas in electronic communication with the speaker controller; a remote including a controller, one or more memory modules in electronic communication with the controller, an antenna in electronic communication with the controller, a user input module in electronic communication with the controller for receiving handler commands, and computer readable instructions stored on the one or more memory modules and executable by the controller to transmit a command to the collar based on user input received on the user input module. When a user input is received on the user input module, the remote transmits a command stored on the one or more memory modules to the speaker and the speaker emits an audible command adjacent a canine wearing the speaker corresponding to the user input received on the remote.

4 Claims, 4 Drawing Sheets

(56) References Cited

U.S. PATENT DOCUMENTS

| | | | |
|---|---|---|---|
| 2007/0204803 A1* | 9/2007 | Ramsay | A01K 15/021 |
| | | | 119/720 |
| 2010/0095896 A1 | 4/2010 | Van Wye | |
| 2017/0042121 A1* | 2/2017 | Jersa, III | A01K 15/023 |
| 2017/0202186 A1* | 7/2017 | Bonge, Jr. | A01K 27/009 |

* cited by examiner

REMOTE CANINE TRAINING DEVICE

CROSS-REFERENCES TO RELATED APPLICATIONS

This application claims priority to U.S. Provisional Patent Application Ser. No. 62/362,088 for a Remote Dog Training Device filed on Jul. 14, 2016, and to U.S. Provisional Patent Application Ser. No. 62/371,475 for a Remote Dog Training Device filed on Aug. 5, 2016, the contents of which are incorporated herein by reference in their entireties.

FIELD

This disclosure relates to the field of canine training. More particularly, this disclosure relates to an electronic dog training apparatus for training and controlling a canine.

BACKGROUND

Various canine training techniques utilize devices to train dogs, and the majority rely exclusively on compulsion training which consists of positive punishment and/or negative reinforcement (unpleasant consequences) to coerce or force the dog to do something. Such devices include mechanically choking collars, electrical shock, annoying sprays or pulses. Unfortunately, use of these devices can quickly go from benign to inhumane when in the hands of someone with poor timing and/or a misunderstanding of the science behind how dogs learn.

When the majority of dog training devices which are currently on the market are coupled with poor timing and/or a misunderstanding of the science behind how dogs learn, there is often the following unwanted side effects: defensive/aggressive reactions towards its trainer such as biting or running away; increased probability that subsequent dog owners or those whom are around the dog will get bit secondary to mimicking behaviors that the dog associates with previous training involving compulsive consequences; increase in need to add further punishment towards the dog secondary to habituation on the dog's part; and weakens the bond between a dog and its handler.

Further, the following experience difficulty with the dog receiving commands in environments that present with an increase in distraction and/or increase in distance between the handler and the dog: service dogs, hunters, search and rescue, law enforcement and US soldiers when on patrol and/or engaging in detection.

Currently there are individuals who are unable to utilize a service dog secondary to their inability to intelligibly articulate. This would include, but not be limited to, pathology related to speech impairments (i.e. throat cancer, Muscular Dystrophy, etc.) to traumatic brain injuries.

What is needed, therefore, is an electronic remote canine training device for remotely training and directing a canine.

SUMMARY

The above and other needs are met by a remote canine training device. In a first aspect, a remote canine training device includes: a speaker including a speaker controller and an antennas in electronic communication with the speaker controller; a remote including a controller, one or more memory modules in electronic communication with the controller, an antenna in electronic communication with the controller, a user input module in electronic communication with the controller for receiving handler commands, and computer readable instructions stored on the one or more memory modules and executable by the controller to transmit a command to the collar based on user input received on the user input module. When a user input is received on the user input module, the remote transmits a command stored on the one or more memory modules to the speaker and the speaker emits an audible command adjacent a canine wearing the speaker corresponding to the user input received on the remote.

In one embodiment, the remote further includes a light emission device in electronic communication with the controller. The light emission device projects a light based on user input received on the remote. In another embodiment, the light emission device is a laser. In yet another embodiment, the user input corresponds to a verbal directional command projected to the dog on the speaker.

In a second aspect, a method of training and handling a canine includes: providing a remote control having a plurality of user input commands; receiving one or more user input commands on the remote; retrieving instructions stored on a computer readable storage medium of the remote based on received user input commands; transmitting a command from the remote to a speaker located on a collar worn by a canine; and emitting an audible command on the speaker to the dog, the audible command corresponding to the received user input on the remote.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A remote canine training device and method is provided for training and controlling actions of a canine. The remote canine training device and method enables a handler or trainer to train a canine according to embodiments described herein, and to further control the canine through a remote local to the handler and a collar worn by the canine.

Figure 1:
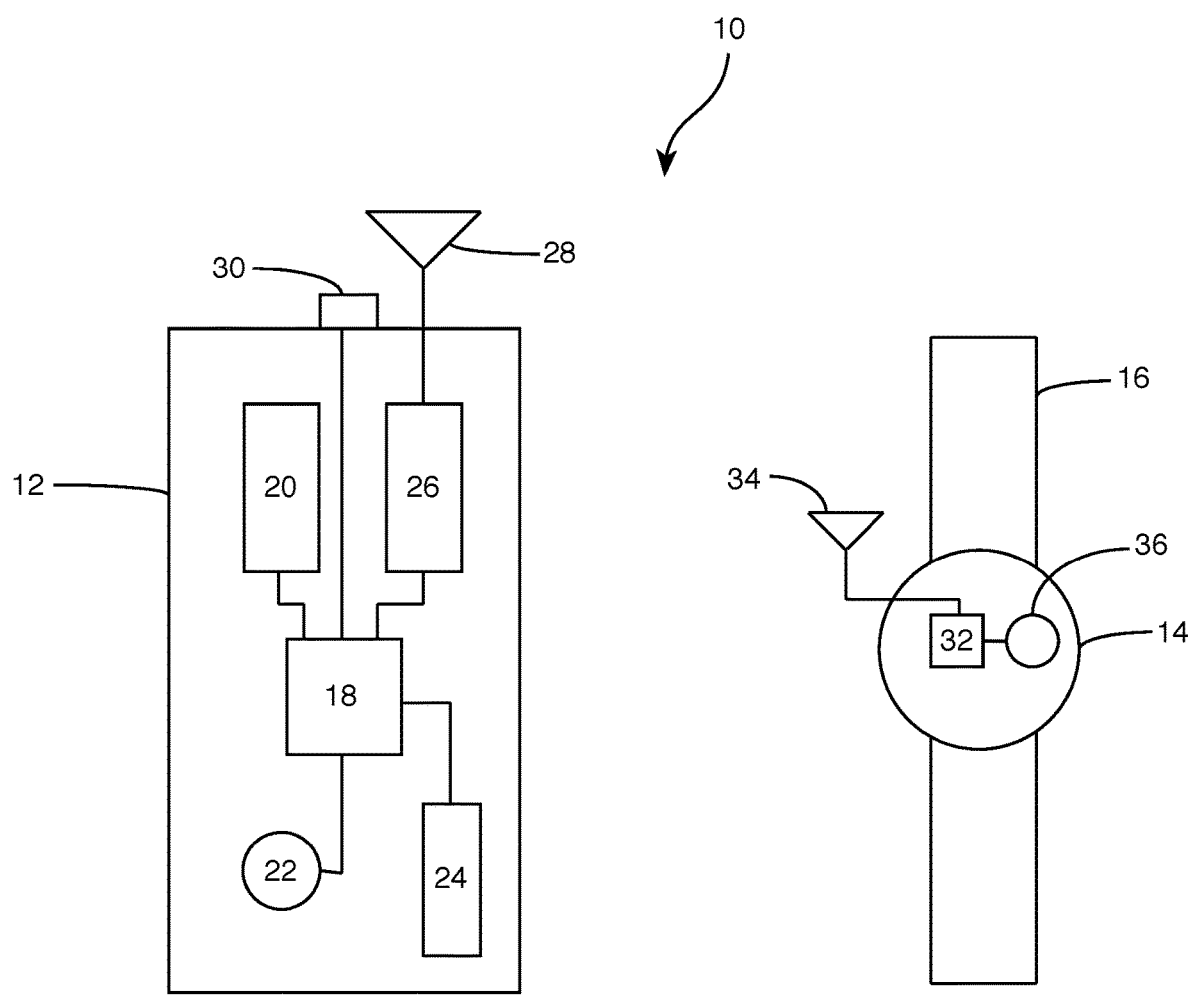
FIG. 1 shows a remote canine training device including a remote and speaker according to one embodiment of the present disclosure.

FIG. 1 shows a basic embodiment of a remote canine training device 10. The remote canine training device 10 includes a handler remote 12 and a speaker 14 located on a collar 16 worn by a canine. The remote 12 is in communication with the speaker 14 on the collar 16, and is configured to instruct the speaker 14 to emit audible commands to the canine based on user input received on the remote.

As shown in FIG. 1, the remote 12 includes a controller 18 in wireless communication with one or more memory modules 20. The controller 18 is preferably a processor, and the memory modules 20 may comprise one or more of transitory and non-transitory computer readable storage medium. Computer readable instructions that are executable on the controller 18 are preferably stored on the memory modules 20. The controller 18 is in electrical communication with a power source 22, such as one or more batteries located on the remote 12. A user input module 24 is in electrical communication with the controller 18 such that the controller 18 receives input related to one or more inputs entered by a handler or user of the remote 12. The user input module 24 may be formed of various suitable user input devices, such as a plurality of labeled buttons (FIGS. 2 and 3), a touchscreen, keyboard, and other known user input devices. A communications module 26 is in electrical communication with the controller 18 and transmits commands from the controller 18 through an antenna 28 located on the remote 12. The remote 12 may further include a light emission device 30, such as a laser, that is in communication with the controller 18. In one embodiment, the remote 12 comprises an existing device such as a smartphone, wherein the remote 12 is in communication with the collar 14 using a wireless protocol such as Bluetooth, WiFi, or other radio transmission.

With further reference to FIG. 1, the speaker 14 is preferably attached to the collar 16 that is worn by a canine. The speaker 14 emits audible commands from the speaker based on user input received on the remote 12 and transmitted to the speaker 14. The speaker 14 may include speaker controller 32 that is in communication with the speaker 14 and antenna 34. The speaker 14 may include a power source 36 such as a battery. Audible commands emitted from the speaker 14 may be in English. Alternative audible commands may include other various languages, and in some embodiments may include sounds recognizable by a canine as corresponding to a particular command.

Figure 2:
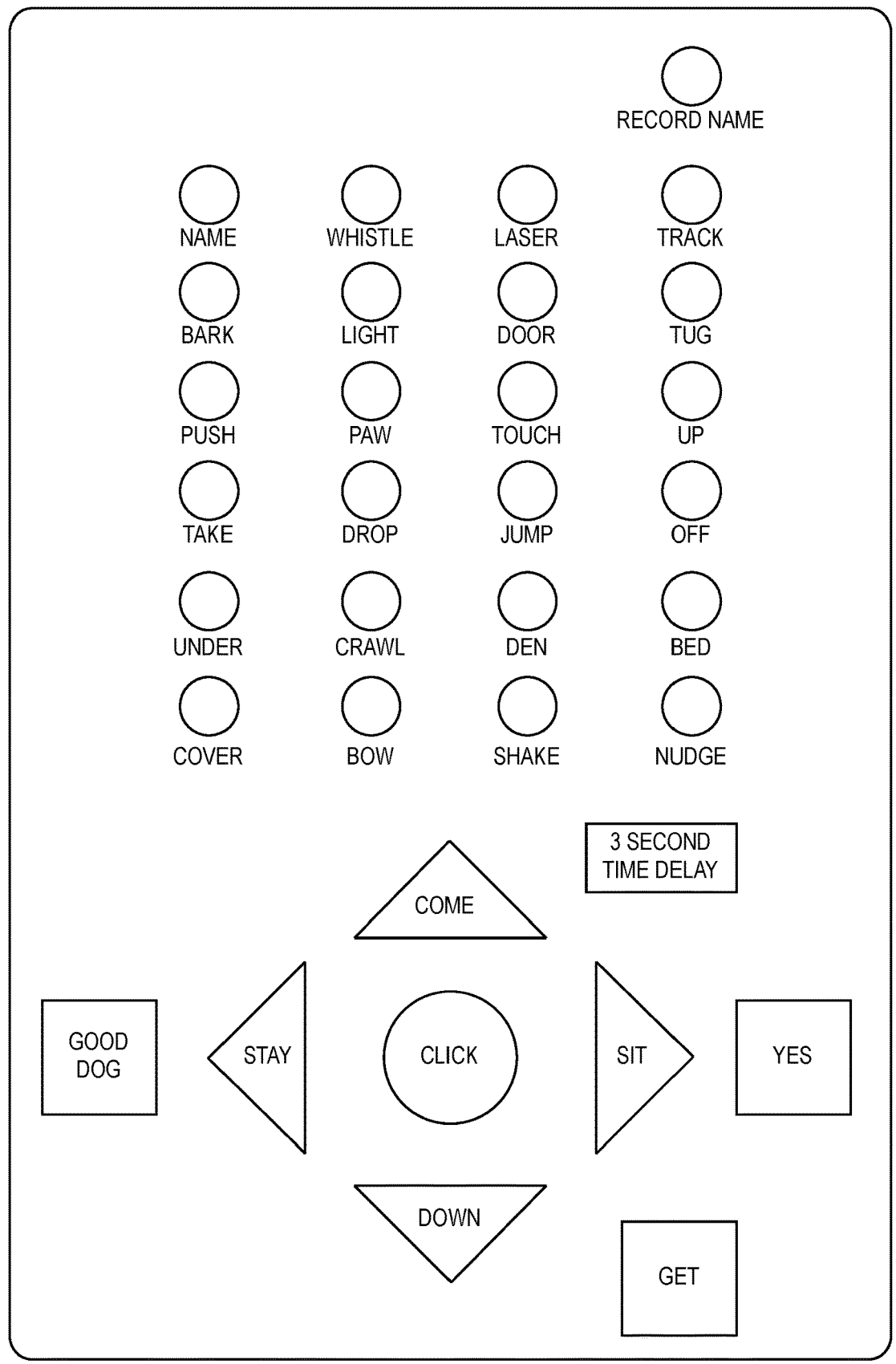
FIGS. 2 and 3 show a layout of user input commands according to one embodiment of the present disclosure.
Figure 3:
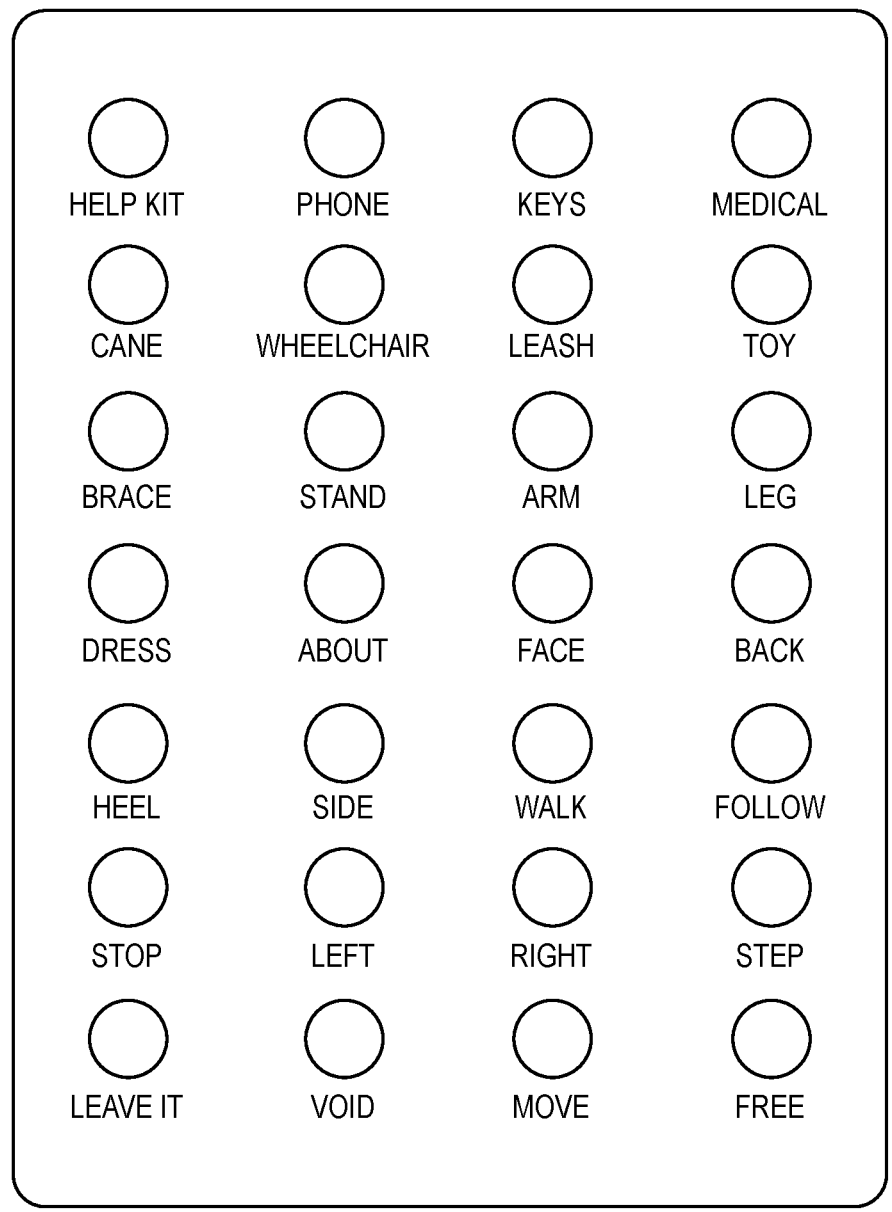

Referring to FIGS. 2 and 3, the user input module 24 preferably includes various user inputs for receiving input from a handler or other user of the remote 12 and creating an audible emission on the speaker 14. The user input module 24 preferably includes the following user inputs and accompanying commands issued from the speaker 14:

NAME—Used to get your dog's attention in preparation for giving other commands.

WHISTLE—May also be used to get your dog's attention and as a directional guide.

LASER—Activates the light emission device 30 (FIG. 1) that may act as a lure and thereby direct the dog to a specific location. i.e. to lie down in a particular place, press a button, pick up a specific item or get a particular person's attention.

TRACK—Instructs the dog to follow the laser in order to follow through with a secondary behavior.

911—Used after the dog has gotten the attention of someone so that they may call 911.

BARK—Instructs the dog to bark by emitting an audible sound instead of the word, which may be useful for warding off potential criminal activity or letting first responders know where the owner is during an emergency.

LIGHT—Instructs the dog to use its mouth and/or nose to turn on a light.

DOOR—Instructs the dog to open or close a door.

TUG—May be used to tell the dog to pull a wheelchair, open a refrigerator, help someone remove their clothing, pull someone to safety or open and/or close a door.

PUSH—Instructs the dog to use its nose to push an object forward, such as a chair or drawer.

PAW—Instructs the dog to use its paw to push a button, ring a bell or alert to a diabetic episode.

TOUCH—Can be used to teach more advanced behaviors such as "NUDGE" or "PUSH", as well as, a directional guide i.e. using the TOUCH command to target the dog from a "SIDE" position to a "HEEL" position.

UP—Instructs the dog to put its front paws on a surface, i.e. in order to take/give something from a cashier, turn on/off a light switch or to facilitate grooming.

TAKE—Instructs the dog to take something off of the floor or from one's hands into its mouth.

DROP—Instructs the dog to drop what is in its mouth, i.e. clothes into a hamper or trash into a trash can.

JUMP—Instructs the dog to get on or inside a structure such as a table or car.

OFF—Instructs the dog to get off or out of a structure, such as a table or car, and immediately sit. This is not the same behavior as that issued by the "DOWN" command.

UNDER—Instructs the dog to go under a structure, such as a chair or table, and lay down.

CRAWL—Instructs the dog to crawl forward while maintaining the down position. This can be useful for getting a dog into a more appropriate position.

BED—Instructs the dog to go lie down on a designated mat, cot or blanket. This can be useful for getting the dog out of the way when the handler has guests.

COVER—Instructs the dog to assist its owner with pulling up/down covers.

BOW—Instructs the dog to bow, often used in greeting someone.

SHAKE—Instructs the dog to offer one of its paws, often used in greeting someone.

NUDGE—Instructs the dog to get the attention of a person by moving its nose against the thigh, arm or face of the person, ideal for alerting to a fire or other emergency situation, as well as a diabetic episode.

COME—Instructs the dog to come directly to you; after "NAME", this command is second in importance due to its ability to mitigate many emergency situations and follow up with other commands.

SIT—Instructs the dog to sit on its hindquarters. This command is useful for putting the dog in a more controlled position, i.e. giving its handler time to go through a door first, providing an anchor for those with Autism or Alzheimer's disease and provide a brace for its handler when trying to go from lying flat on the floor to sitting up.

DOWN—Instructs the dog to lie down on its stomach. This behavior is not the same thing as "OFF". This command is useful for putting the dog in a more controlled position and/or providing an anchor for those with Autism or Alzheimer's disease.

STAY—Instructs the dog to stay in its current position. This command is useful for calming the dog and/or keeping the dog out of the way.

GOOD DOG—Consistently and successfully pairing "GOOD DOG" with a treat, will eventually allow the handler to minimize the dog's dependence on treats as a reward. Varied use of treats has been shown to strengthen the probability that the dog will perform the desired behavior. This feature would only be utilized after the dog has demonstrated the ability to carry out the desired behavior with 100% consistency.

GET—This button is used to train the dog to get specific items, such as "PHONE", "MEDICAL KIT", "WHEELCHAIR", "TOY" or even "HELP".

TIME DELAY/3 SECS—Allows each command to be heard after a 3 second delay. This is useful for allowing the handler to get into precarious positions and thereby use better timing of the command with the desired behavior. This feature will best be utilized by traditional trainers.

BRACE—Instructs the dog to either maintain the sit or stand position in order to facilitate its handler from getting up from the floor or the supine position.

STAND—Instructs the dog to stand up on all four legs. This command is useful in preparation for walks and/or dressing the dog.

ARM—Instructs the dog to use its mouth and/or nose to assist its handler with repositioning their arm.

LEG—Instructs the dog to use its mouth and/or nose to assist its handler with repositioning their leg.

DRESS—Instructs the dog to assist in putting on its vest and/or equipment by either walking forward or backward.

ABOUT—Instructs the dog to turn its body 180 degrees to assist its handler with dressing and/or grooming the dog.

FACE—Instructs the dog to face its handler. This command is useful when preparing the dog for follow-up commands, such as going under a structure or walking backwards.

BACK—Instructs the dog to walk backward. This command is useful for getting the dog out of the way or going through a dog backwards.

HEEL—Instructs the dog to go to its handler's left side.

SIDE—Instructs the dog to go to its handler's right side.

WALK—Instructs the dog to start walking forward at its handler's side.

FOLLOW—Instructs the dog to follow behind its handler. This command is useful for going through narrow routes.

STOP—Instructs the dog to stop walking, even if its handler keeps walking. This command is useful for avoiding dangerous situations like crossing streets and also allowing the handler to verify the safety of a situation before crossing a threshold, i.e. doorways or streets.

LEFT—Instructs the dog to turn left.

RIGHT—Instructs the dog to turn right.

STEP—Instructs the dog to go up or down the next step. This command is useful for handlers that need forward momentum, as well as assistance for the dog as a brace.

LEAVE IT—Instructs the dog to stop paying attention to whatever is distracting it and either look at its handler or continue previous behavior, i.e. walking.

VOID—Instructs the dog to relieve itself.

MOVE—Instructs the dog to move away from its current position. This command is useful for getting the dog out of someone or something's way.

FREE—Tells the dog that it is no longer working, can explore and do as it wants.

RECORD NAME—this allows the pet handler to record the name of the dog.

When a user selects one or more of the above user inputs, the selection is transmitted from the user input module 24 to the controller 18. The controller 18 retrieves a command based on instructions stored on the memory module 20 and transmits the command to the speaker 14 on the collar 16.

Effectiveness of the remote canine training device depends on integration of modern dog training, which consists of the knowledge and application of clicker training, the science behind how dogs learn and most importantly, the humane treatment of dogs. That being said, in order to more effectively use the device of the present disclosure, it is recommended that all users whom possess no education in dog training study information pertaining to clicker training and/or consult with a professional dog trainer.

A user or handler using the device of the present disclosure should be familiar with the following terminology to make effective use of the device:

Consequences—Those things that are used to follow up a desirable or undesirable behavior resulting in either an increase or decrease in the dog's behavior.

Reinforcement—Any event such that when something is added or removed from a situation starts or increases the likelihood of a behavior.

Punishment—Any event such that when something is added or removed from a situation stops or decreases the likelihood of a behavior.

Reinforcer—The actual element of reinforcement which when added or taken away from a situation starts or increases the likelihood of a behavior reoccurring. Giving a treat to a dog to increase the behavior of walking at its handler's side is an example of using a reinforcer. Another example of a reinforcer being used would entail the dog choosing to remain at its owner's side in order to prevent the handler from stopping (or taking away) any forward movement.

Punisher—The actual element of punishment which when added or taken away from a situation stops or decreases the likelihood of a behavior reoccurring. Closing the curtain or taking away the dog's view so the dog will stop barking when it sees the neighbor's dog is an example of using a punisher. Another example involves installing an electrical fence (adding something) to prevent the dog from running away. In this case, the electrical shock is a punisher that is being added to decrease the behavior of running away. Punishers range from something benign to unpleasant, and in worst case scenarios, inhumane.

Positive contingency—A relationship between a dog and its trainer, such that if the dog does something, then its behavior will be followed up with the arrival of something. For example, if the dog sits upon command, its behavior will be followed up with the arrival of a treat; if the dog gets into the garbage can, its behavior will be followed up with a verbal "NO!".

Negative contingency—A relationship between the dog and its trainer, such that if the dog does something, then its behavior will be followed up with the ability to stop or avoid something. For example, if the dog jumps on its trainer, the trainer will subsequently turn its back; As a result of staying out of the garbage can, the dog avoids the verbal correction.

Combining the aforementioned information results in what is commonly called the quadrants of operant conditioning: Positive Reinforcement; Negative Reinforcement; Positive Punishment; Negative Punishment.

The differential advantages offered by this device in comparison to devices already on the market lies in the fact that the device in and of itself administers no consequences. That being said, the dog handler can decide whether or not to administer traditional and/or modern dog training.

Whether one elects to follow up the dog's behavior with a punisher or reinforcer in order to get or stop a behavior, we caution against using consequences that would be physically or mentally traumatizing to the dog.

Figure 4:
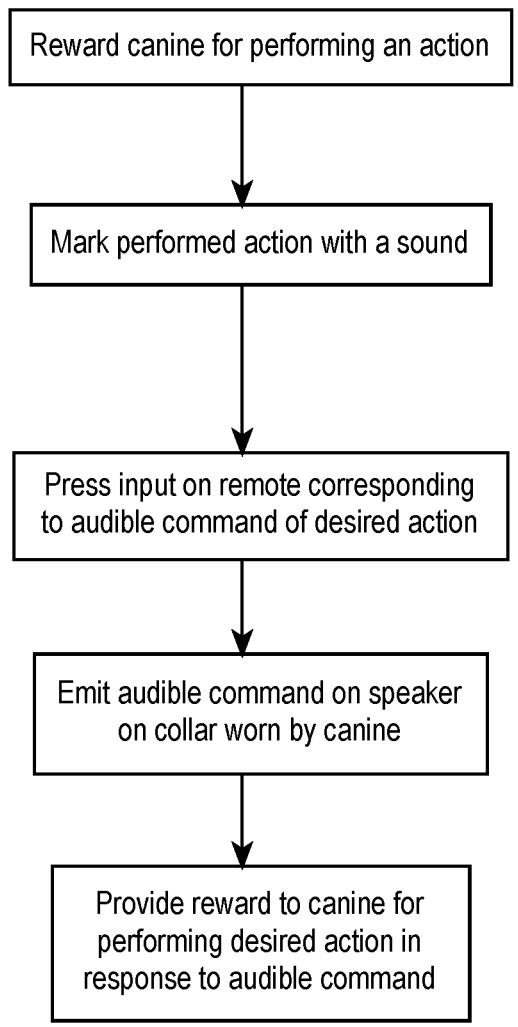
FIG. 4 shows a flow chart of a method of training and handling a canine according to one embodiment of the present disclosure.

Whether a handler elects to use any or all of the training methods described herein, methods of the present disclosure involve the same sequence. A dog performs a desired behavior>handler immediately marks the behavior through use of either the "CLICK" or "WHISTLE" button>reward is immediately administered from the choice of praise, petting, treat or a toy (FIG. 4). The dog then learns to associate the correct behavior with both a sound and a reward coupled together.

Capturing—finding a behavior that occurs naturally, marking it and finally associating it with the command. For example, if one wants to teach the dog to bark on command, they would utilize the following steps. Dog barks>mark the behavior with the "CLICK" or "WHISTLE" button>dog receives a reward. This process should be repeated until it is obvious that the dog has made the association between the desired behavior with the follow up of the reward.

Once the dog is deliberately barking in order to elicit a reward, it is time to teach the dog the "bark" command via the "BARK" button. Push the "BARK" button as the dog is barking>mark the behavior with the "CLICK" or "WHISTLE" button>dog receives a reward. This process should be repeated up to 50 times.

The last step requires the user to push the "BARK" button before the dog barks>dog barks>mark the behavior with the "CLICK" or "WHISTLE" button>dog receives a reward.

Luring—involves using something the dog will follow, i.e. food or hand held target, in order to get the desired behavior. For example, in order to teach a dog to sit via luring, utilize the following steps: Without allowing the dog to get the treat, the handler takes a treat and runs it from above the dog's nose towards the back of the dog's head until the dog partially or completely sits>mark the behavior with the "CLICK" or "WHISTLE" button>dog receives a reward. This process should be repeated until it is obvious that the dog has made the association between the desired behavior with the follow up of the reward.

Once the dog is deliberately sitting in order to elicit a reward, it is time to teach the dog the "sit" command via the "SIT" button. Push the "SIT" button as the dog is sitting>mark the behavior with the "CLICK" or "WHISTLE" button>dog receives a reward. This process should be repeated up to 50 times.

The last step would require the user to push the "SIT" button before the dog sits>dog sits>mark the behavior with the "CLICK" or "WHISTLE" button>dog receives a reward.

Shaping—breaking a desired behavior down into individual behaviors, marking each individual behavior followed by a reward until the dog learns the entire behavior. For example, in order to teach a dog to go to the door and bark when the doorbell rings, utilize the following steps:

Have a partner ring the doorbell while both you and the dog are on the other side of the door.

Dog looks at or takes step towards the door>mark the behavior with the "CLICK" or "WHISTLE" button>dog gets a reward. This process should be repeated up to 50 times.

Now it is time to take the dog into another room and repeat the aforementioned sequence. This process should be repeated up to 50 times.

Once the dog is deliberately going to the door, it is time to teach the dog to go to the door and bark upon hearing the doorbell ring.

During this sequence, the reward will be withheld when the dog goes to the door in order to get the dog to try different behaviors. If you withhold the reward, most dogs will usually vocalize due to frustration. Once the dog is going to the door and vocalizing upon hearing the doorbell ring, it will then be reinforced. In this case, the dog does not need a command to elicit the desired behavior because the dog is being cued by the sound of the doorbell.

Molding—physically assisting the dog into the desired position. This training technique is most associated with traditional training. The success of this technique relies upon the dog getting into the desired positon in order to avoid the discomfort of being physically manipulated. For example, the steps to teach a dog to sit by using the molding technique are as follows:

While the dog is standing, the handler will simultaneously push down on the dog's hind quarters while lifting up on the collar. As soon as the dog is in the sit position>mark the behavior with the "CLICK" or "WHISTLE" button>dog gets a reward. This process should be repeated up to 50 times.

As soon as the dog is willingly allowing its hind quarters to be pushed down, teach the dog the sit command via the "SIT" button. Push the "SIT" button at the same time as the dog's hind quarters>mark the behavior with the "CLICK" or "WHISTLE" button>dog receives a reward. This process should be repeated up to 50 times.

The last step requires the user to push the "SIT" button>dog sits>mark the behavior with the "CLICK" or "WHISTLE" button>dog receives a reward.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:
1. A remote canine training device comprising:
a speaker including a speaker controller and an antenna in electronic communication with the speaker controller;
a remote including:
a controller;

one or more memory modules in electronic communication with the controller;

an antenna in electronic communication with the controller;

a plurality of user inputs in electronic communication with the controller, the plurality of user inputs selectable by a user for receiving handler commands; and computer readable instructions stored on the one or more memory modules and executable by the controller to transmit a command to a collar based on user input received on the plurality of user inputs;

wherein when a user input is received on one of the plurality of user inputs, the remote transmits a verbal command stored on the one or more memory modules to the speaker controller through the antenna and wherein the speaker emits a verbal command audible to a canine wearing the speaker, the verbal command corresponding to one of the plurality of user inputs received on the user input module through the the remote.

2. The remote canine training device of claim 1, the remote further comprising a light emission device in electronic communication with the controller, wherein the light emission device projects a light based on user input received on the remote.

3. The remote training device of claim 2, wherein the light emission device comprises a laser.

4. A method of training and handling a canine comprising:
 providing a remote control having a plurality of user input commands;
 receiving one or more user input commands on the remote;
 retrieving instructions stored on a computer readable storage medium of the remote based on received user input commands;
 transmitting a verbal command from the remote to a speaker located on a collar worn by a canine;
 emitting an audible verbal command on the speaker to the dog, the audible verbal command corresponding to the received user input on the remote.

* * * * *